Sept. 30, 1969    F. GAGEUR    3,469,291
CHAIN TRACK ASSEMBLY FOR TENTER CLIPS
Filed June 29, 1967    2 Sheets-Sheet 1

INVENTOR
FRITZ GAGEUR

BY *James E. Bryan*
ATTORNEY

INVENTOR
FRITZ GAGEUR

United States Patent Office 3,469,291
Patented Sept. 30, 1969

3,469,291
CHAIN TRACK ASSEMBLY FOR TENTER CLIPS
Fritz Gageur, Lindau, Germany, assignor to Lindaure Dornier Gesellschaft m.b.H., Lindan, Bodensee, Germany, a limited-liability corporation of Germany
Filed June 29, 1967, Ser. No. 650,007
Claims priority, application Germany, Aug. 25, 1966, L 54,401
Int. Cl. D06c 3/04
U.S. Cl. 26—61    10 Claims

ABSTRACT OF THE DISCLOSURE

A vertical guide rail is secured to a mounting means so as to define an upper bearing surface above the mounting means and a lower bearing surface below the mounting means. Each of a plurality of similar tenter clips includes roller means disposed on opposite sides of the upper and lower bearing surface portions of the guide rail. Each tenter clip includes chain rollers for engaging a drive means. Adjacent tenter clips are interconnected by link means to form an endless chain, and vertical roller means is supported by each link means for engaging an underlying substantially horizontal support surface.

CROSS-REFERENCE TO RELATED APPLICATION

Figure 1:
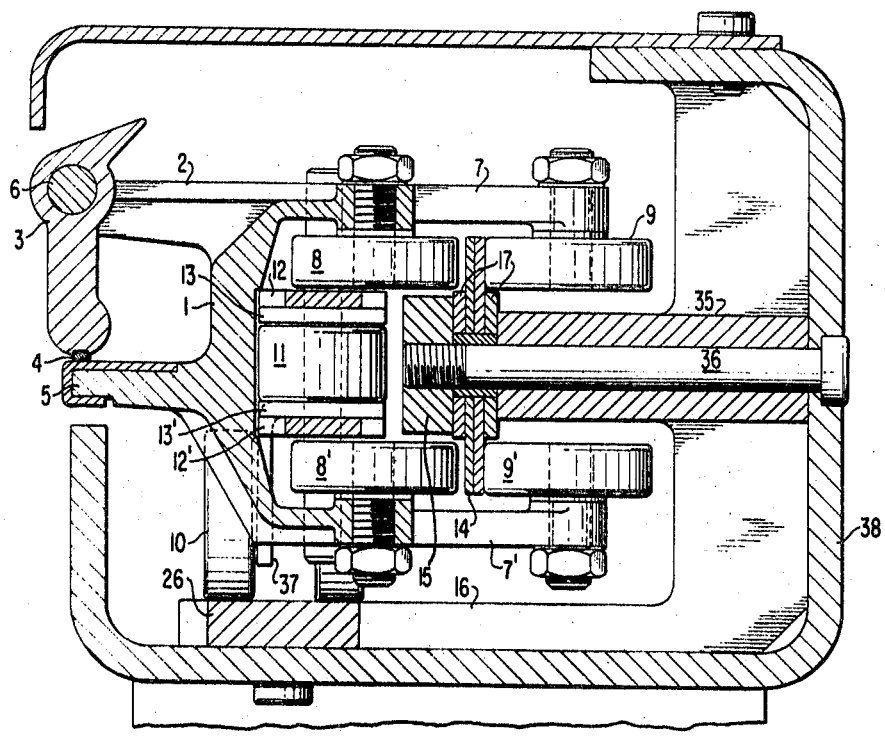

The present invention is an improvement over the chain track assembly for tenter clips described and claimed in copending application Ser. No. 515,795, filed Dec. 22, 1966.

The copending application, supra, discloses a chain track assembly for tenter clips. Tenter clips of this type and complete tenter clip chains are employed in the textile art for tentering frames and also for purposes of stretching thermoplastic foils. The tenter clips are provided with rollers for the horizontal and vertical positioning and also the guiding of the clips. Since the clips or clip chains are composed of a plurality of sections, the individual section form an angular joint with each other. As a result, gaps are produced at these joints which very greatly impair the running or traveling of the tenter clip chain.

In order to eliminate this disadvantage, it is proposed in the copending application, supra, to provide, as rolling or contact surfaces for the rollers of the tenter clips which absorb the horizontal tensional forces, a flexible, jointless and vertically-positioned guide rail against which the rollers abut from both sides with a small amount of play. The flexible guide rail is constiuted by a plurality of spring steel bands clamped together. Any angles and impact points are eliminated so that the clip chain runs quietly. By virtue of the fact that the rollers which absorb the horizontal tensional forces abut against the flexible guide rails from both sides, the rollers at all times have the same direction of rotation even in case they should lift off of the guide rail for any reason. Any braking of the rollers or even a reversal of the direction of rotation thereof, as has occurred in tenter clip chains hitherto known, is effectively prevented with the construction described in the copending application, supra, and considerably higher traveling speeds for the clip chain are obtainable. Specific track means are provided for the vertical rollers, which carry the weight of the tenter clip, at the junction points between two consecutive chain track sections, i.e., at the angular joints, and these means eliminate impact points there also and ensure quite operation. A further feature of the copending application, supra, is that the function of the horizontal and vertical rollers is separate from the function of the chain rollers and separate rollers are provided for each of these two functions.

In the construction of the copending application, supra, the spring steel bands, which are clamped together to form the guide rail, are mounted on the guide rail carrier between two angular supports. The horizontal rollers are mounted at the height of the clip table, which also is at the height of the material to be tentered. The chain rollers are positioned below the horizontal rollers and in front of the guide rail. The vertical roller is mounted below the tenter clip table.

The present invention relates to a further development of the construction described in the copending application, supra, and provides for an even more uniform and easier running of the tenter clip chain. In the construction of the present invention, the flexible guide bar is secured from the side facing away from the material to be treated in a manner such that rolling surfaces are produced for the horizontal rollers of the tenter clips both above and below the clamping points and substantially symmetrically with respect to the plane of the material to be treated. Preferably, the guide rail is clamped to a web portion mounted on the rear wall of a housing which encloses the tenter clip chain. In this construction of the guide rail, each clip has two rolling surfaces for the horizontal rollers, i.e., above and below the clamping point for the flexible guide rail and also above and below the clamping point for the material to be treated. The mounting of the horizontal rollers may be similar to that shown in the copending application, supra, i.e., in a triangular configuration. The advantage of this mounting of the tenter clip, in conjunction with the particular manner of securing the flexible guide rail, is that considerably smaller and lighter rollers may be employed and the load is distributed very evenly. The chain rollers, by means of which the individual tenter clips are connected together to form a complete chain and into which rollers the drive gears mesh at the reversing zones, are mounted in front of the horizontal rollers at the height of the clip chain table and also in front of the guide rail.

Another particular advantage is that the vertical roller, in contrast to the construction of the copending application, supra, is no longer mounted at the clip body itself but, instead, on the chain links between two consecutive clips. This construction is such that the vertical roller is positioned alternately on the front side and on the rear side, i.e., on the side of a connecting link which faces the material to be tentered and on the side of a next connecting link which faces away from the material. The result is a wider rolling or running track for the tenter clip chain and any tilting of the tenter clips is effectively prevented.

Figure 3:
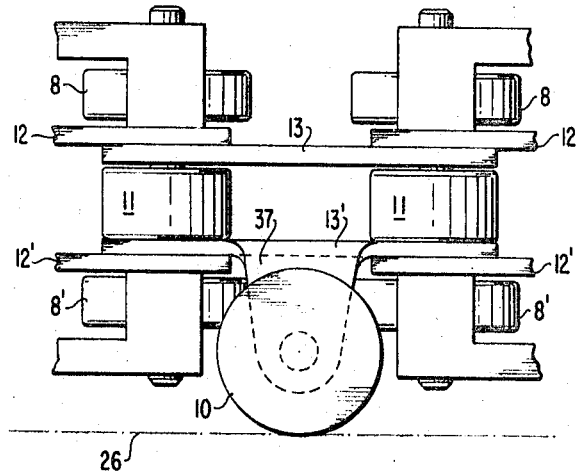
Figure 2:
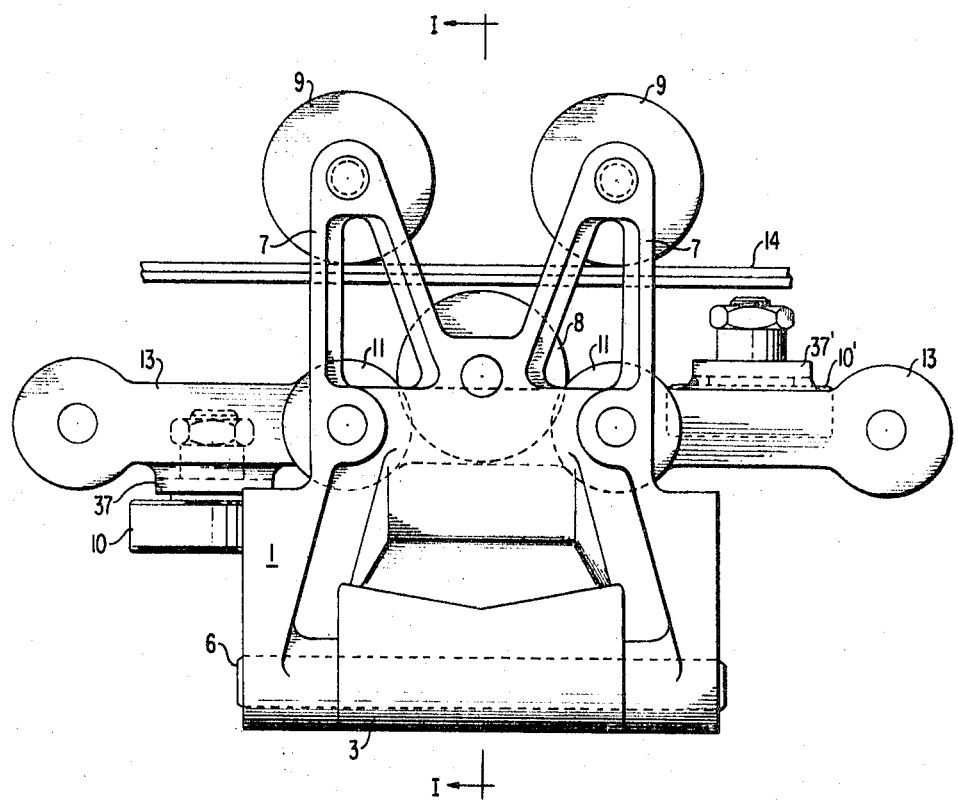

Referring to the accompanying drawings in which one embodiment of the present invention is shown, FIGURE 1 is a cross-sectional view in elevation through a tenter clip chain track assembly according to the present invention, FIGURE 2 is a top view of a tenter clip together with the guide rail therefor, and FIGURE 3 is a front elevational view showing the vertical roller.

Referring to FIGURE 1, a chain track carrier 16 is enclosed, together with the clip chain, in a housing 38. Secured to the rear wall of the housing 38 is a web portion 35 which, instead, may be a series of individual supports which extend forwardly toward the material to be treated. Through this web portion 35 extend the bolts 36 by means of which internally threaded clamping members 15 secure the guide rail 14 to the rear of the housing wall 38. As in the construction of the copending application, supra, the guide rail consists of a plurality of flexible and continuous spring steel bands 14 and additional reinforcing members 17 may be provided at some points, if necessary. The clamping point of the flexible guide rail, i.e., of the set of spring bands 14, is mounted essentially at the same height as the clip table 5, i.e., at the same height as the material to be tentered. On the guide rail above and below the clamping point are rolling surfaces for those rollers of the tenter clips which have the function of counteracting the horizontal forces.

The operative engagement of the rollers of the tenter clip with the guide rail is apparent from FIGURES 1 and 2. The tenter clip comprises a clip body 1 having a tenter clip table 5. The tenter clip body 1 includes the arms 2 at which the lever 3, together with the edge 4 thereof, is pivotally mounted on the bolt 6. Further mounted on the clip body 1 are the arms 7 which extend rearwardly and away from the material to be tentered and support the rollers 8 and 9. The same roller arrangement also is present on the underside of the tenter clip and the latter rollers and supporting arms are designated with reference numerals 8', 9', and 7', respectively.

During operation, the rollers 8 and 9 above the clamping point of the guide rail 14 and the rollers 8' and 9' below the clamping point rest against the flexible guide rail with a small amount of play. The rollers may be positioned in a triangular configuration, as in the construction of the copending application, supra, so that the rollers 8 and 8' will be positioned on the side of the guide rail facing the material to be tentered and the rollers 9 and 9' will be positioned on the side of the guide rail facing away therefrom. Since the roller bearing surfaces of the upper and lower roller arrangements extend symmetrically to the material being tentered on the tenter clip table 5, a uniform distribution of the load is obtained.

Mounted between the upper and lower rollers essentially at the height of the clamping point are those members which unite the individual tenter clips to form a closed chain. Specifically, there are provided in each tenter clip two chain rollers 11 which are connected within the tenter clip by means of roller bushings and a pair of connecting links 12 and 12'. The connection to an adjacent tenter clip of the chain is established by means of an additional pair of chain links 13 and 13'. The distinction between the upper and lower links of a pair is again made by the use of a prime. By reason of the fact that the chain rollers 11 are mounted between the upper and lower sets of rollers, the running characteristics are considerably improved, particularly also at the driving points of the chain.

In FIGURE 3, the intermediate member between two consecutive tenter clips is shown schematically in a front view. The chain rollers 11 of a first and of the next following tenter clip are connected with each other by means of the pair of links 13, 13'. The construction is such that the lower connecting link 13' of one pair includes a lobe portion 37 which is bent over downwardly. Mounted at this lobe is the roller 10 which supports the vertical forces, i.e., the weight of the tenter clip chain. The rolling surface of this vertical roller is identified by numeral 26 in FIGURES 1 and 3. As is apparent from FIGURE 2, the lobes of the lower connecting links 13' are positioned alternately on the side of the connecting links facing the material to be tentered and on the side facing away therefrom. The lobe 37 facing the tentered material is visible on the left-hand side in FIGURE 2; it carries the roller 10. On the other side of the tenter clip, the lobe is mounted on the side facing away from the material and is identified by reference numeral 37'. It carries the roller 10'. When the vertical rollers 10 and 10', respectively, are alternately mounted, with respect to the flexible guide rail 14, a wide track is obtained which effectively prevents tilting of the tenter clips.

All of the constructional features of the angular joints of the chain track described in the copending application, supra, and which insure a quiet, impact-free run of the vertical rollers may be employed in conjunction with the construction of the present invention.

It will be obvious to those skilled in the art that many modifications may be made within the scope of the present invention without departing from the spirit thereof, and the invention includes all such modifications.

What is claimed is:

1. A chain track assembly for tenter clips comprising a substantially vertical flexible and jointless guide rail, mounting means connected to the guide rail and extending from one side of the guide rail, said guide rail including an upper bearing surface portion positioned above said mounting means and a lower bearing surface portion positioned below said mounting means, and a plurality of tenter clips guided by the guide rail, each clip carrying material holding means for holding material at a point thereon and each including upper roller means for engagement with said upper bearing surface portion and lower roller means for engagement with said lower bearing surface portion, said upper roller means including at least one roller disposed on one side of said upper bearing surface portion and at least two rollers disposed on the opposite side of said upper bearing surface portion, said lower roller means also including at least one roller disposed on one side of said lower bearing surface portion and at least two rollers disposed on the opposite side of said lower bearing surface portion, adjacent tenter clips being interconnected with one another by link means to form an endless chain.

2. A chain track assembly as defined in claim 1 wherein said upper and lower bearing surfaces are positioned substantially symmetrically above and below the clamping point of an adjacent tenter clip.

3. A chain track assembly as defined in claim 2 wherein each of said tenter clips includes chain rollers disposed at the side of said guide rail opposite from the side from which the mounting means extends, said chain rollers being disposed between said upper and lower roller means and substantially at the vertical level of the clamping point of the associated tenter clip.

4. A chain track assembly as defined in claim 1 including a support, said mounting means being connected to said support, said support comprising a housing enclosing said guide rail.

5. A chain track assembly as defined in claim 1 including a substantially horizontal support surface and vertical roller means supported by said link means for engaging said substantially horizontal support surface.

6. A chain track assembly as defined in claim 5 wherein each of said link means includes a downwardly bent-over lobe portion, said vertical roller means being supported on said lobe portions.

7. A chain track assembly as defined in claim 6 wherein the lobe portions of successive links are positioned at varying distances from said guide rail.

8. A chain track assembly as defined in claim 1 wherein said upper roller means includes three rollers disposed in a triangular arrangement, said lower roller means also including three rollers disposed in a triangular arrangement.

9. A chain track assembly as defined in claim 8 wherein one roller of each of said upper and lower roller means is disposed at the side of the guide rail facing said tenter clips, each of said upper and lower roller means including two rollers on the side of the guide rail from which the mounting means extends.

10. A chain track assembly as defined in claim 1 wherein each of said tenter clips includes three upper guide rollers and three lower guide rollers, two chain rollers and a vertical roller.

References Cited

UNITED STATES PATENTS

| | | |
|---|---|---|
| 469,221 | 2/1892 | Babcock. |
| 1,478,454 | 12/1923 | Renold. |
| 2,530,119 | 11/1950 | Dungler. |
| 3,050,816 | 8/1962 | McCreary. |
| 3,123,854 | 3/1964 | Aykanian. |
| 3,148,409 | 9/1964 | Bruckner. |
| 3,247,544 | 4/1966 | Bromley. |
| 3,256,558 | 6/1966 | Andersen et al. |
| 3,327,367 | 6/1967 | Dungler. |
| 3,391,421 | 7/1968 | D'Onofrio et al. |

FOREIGN PATENTS

| | | |
|---|---|---|
| 1,272,020 | 8/1961 | France. |

ROBERT R. MACKEY, Primary Examiner

U.S. Cl. X.R.

18—1